June 15, 1965 C. E. BENJAMIN 3,189,798

MONOLITHIC SEMICONDUCTOR DEVICE AND METHOD OF PREPARING SAME

Filed Nov. 29, 1960 5 Sheets-Sheet 1

*INVENTOR.*

Charles E. Benjamin

*BY* Frederick Shapoe

ATTORNEY

June 15, 1965 C. E. BENJAMIN 3,189,798

MONOLITHIC SEMICONDUCTOR DEVICE AND METHOD OF PREPARING SAME

Filed Nov. 29, 1960 5 Sheets-Sheet 2

PRIOR ART

United States Patent Office 3,189,798 Patented June 15, 1965

3,189,798

MONOLITHIC SEMICONDUCTOR DEVICE AND METHOD OF PREPARING SAME

Charles E. Benjamin, Penn Hills, Pa., assignor to Westinghouse Electric Corporation, East Pittsburgh, Pa., a corporation of Pennsylvania Filed Nov. 29, 1960, Ser. No. 72,341
15 Claims. (Cl. 317—234)

This invention relates generally to monolithic semiconductor devices and is more particularly concerned both with a new and improved method for isolating different regions of such devices performing different electronic functions and with certain new and improved devices resulting from the use of this technique in producing a number of different conventional electronic circuits each formed in a unitary body of semiconductor material.

At the present time, a large majority of electronic circuits are fabricated from conventional components such as resistors, capacitors, inductors, vacuum tubes, transistors, etc. interconnected by means of leads or wires having soldered, brazed or welded joints. Since each of the individual circuit components and each of the joints represent potential points of circuit failure during operation, it is apparent that the reliability of the complete circuit depends directly upon the number of components employed and on the number of connecting joints in the circuit. In complex electronic circuits employing many thousands of individual components as, for example, in guidance systems for use on missiles and rockets, the problem of providing completely reliable circuit operation becomes extremely acute, particularly when it is considered that such circuits are frequently subjected to extreme operating conditions resulting from vibration, wide temperature ranges, and the like, which are apt to increase the likelihood of circuit failure. While modern printed circuit techniques have simplified the problem of forming the circuit junctions, for example, by dipping the complete printed board in a solder bath, these techniques have not increased the reliability of the circuit formed to any significant degree since the total number of soldered joints remains approximately the same. Another recent trend has been the combination of several electronic components encased within a ceramic or resin covering so that only a few leads emanate from the encapsulation, but such arrangements still employ the same number of basic components and soldered joints as would be required if ordinary components were assembled in conventional manner and, as a consequence, these arrangements have not solved the reliability problem.

A more recent approach to the problem of increasing the circuit reliability has been the development of monolithic semiconductor devices which reduce the number of electronic components by forming in a single semiconductor body a number of different areas or regions each of which performs the function of a conventional circuit component. All of the regions cooperate to provide a single electronic function and, since they are connected through the body of the semiconductor material, the only soldered connections are those required for the relatively few external leads emanating from a single semiconductor wafer or crystal. Monolithic semiconductor devices of this type thus improve the expected reliability of the system not only by reducing the number of components employed but also by significantly decreasing or eliminating both the leads required between the components and the soldered joints used to connect these leads in the circuit. One of the more severe problems in the formation of semiconductor devices of this type has been that of isolating the different regions of the device performing the functions of the individual components of the electronic circuit. Thus, it is common practice to form the monolithic semiconductor device by beginning with a thin, flat wafer having several layers of different conductivity types. Due to the thinness of the wafer, it is difficult, if not impossible, to isolate different areas of the wafer by drilling passages sidewise or endwise through the wafer in such manner that these passages extend parallel to the upper and lower flat surfaces. It is, of course, very easy to form passages extending into the flat faces either partially through the wafer or entirely therethrough and, hence, the present invention provides monolithic semiconductor devices in which the different regions are isolated without requiring the formation of holes or passages extending parallel to the flat faces of the wafer.

The term "region" as used herein is an area in a semiconductive material which contains at least one p-n junction extending across at least a part of the area; the region can, for example, perform the function of a capacitor, a transistor, a voltage regulating diode, a tunnel diode, a p-n-p-n switch or a p-n short. The discontinuities or grooves should pass through at least one of the p-n junctions in a region.

The term "slot" as employed herein denotes a perforation, passage or slit extending completely through from face to face of a wafer or a body of semiconductor material. The term "trough" as employed herein denotes a groove or other physically removed portion forming a discontinuity, in one face and extending through one or more semiconductive layers but not completely penetrating, a body of semiconductor material.

Another object of the present invention is to provide a new and improved method of isolating different regions of a semiconductor wafer by forming at least two intersecting troughs extending partly through the wafer from opposite faces and of a combined depth greater than the thickness of the wafer so that at the point of intersection they form a slot, and at least one end of each trough terminating at an edge.

An object of the invention is to provide a new and improved method of isolating different regions of a flat, multiple layer, semiconductor wafer by forming at least one slot extending completely through the wafer between its flat faces and by forming discontinuities in the layers respectively lying adjacent the two flat faces with each such discontinuity extending only partially through the wafer and with both of the discontinuities having at least one end terminating at one slot and the other end terminating at another slot, another discontinuity or an edge of the wafer.

It is also an object of the present invention to provide a new and improved method for forming the discontinuities referred to above by first forming a groove or trough extending into the wafer from a first of its flat faces towards a second flat face, by then diffusing into both of the flat faces a doping material to form diffused layers respectively lying adjacent the flat faces but of such depth that they meet in the area between the trough and the second face, and by then removing the layer adjacent the first flat face to expose an inner layer of the wafer so that the diffused area around the trough forms a discontinuity in the exposed inner layer of the wafer.

The invention has for a further object the provision of a new and improved method for forming monolithic semiconductor devices wherein the disconuities referred to above are formed by troughs extending into the semiconductor wafer from one or more of its flat surfaces with the troughs being sufficiently deep to penetrate at least through the layer lying adjacent the flat surface in which the trough is formed.

A still further object of the invention is to provide a new and improved method for forming a monolithic semiconductor device of the character described above wherein the discontinuities in the outer layers lying adjacent the flat surfaces are formed by portions of the next succeeding layer which portions extend through the outer layers to the flat surfaces and have one end terminating at a hole extending through the wafer between its flat faces.

The invention has for another object the provision of a new and improved monolithic multiple layer semiconductor device made up of different regions respectively performing the functions of different components of an electronic circuit with the regions being separated by at least one slot extending through the semiconductor device and by one or more discontinuities extending through portions of some of said layers from both of the flat faces with the discontinuities each having one end terminating at the slot and the other end terminating in another slot, another discontinuity or an edge of the wafer.

The invention has for another object the provision of a parallel resistance-capacitance network formed within a unitary or monolithic multiple layer body of semiconductor material made up of a p-n junction reverse biased to form an energy storage region and an energy dissipative region formed within the semiconductor material with these regions being interconnected through the bulk of the semiconductor material without external leads between the regions and with isolation between the regions being obtained by means of at least one slot extending between the flat faces of the semiconductor material and by discontinuities formed in the layers to extend across the flat faces and to terminate at one end at a slot.

Another object of the invention is to provide a multi-vibrator circuit either of the free-running or triggered type comprising cooperating regions of a new and improved unitary or monolithic multiple layer body of semiconductor material having a plurality of different regions respectively performing the functions of components of an electronic circuit and with the regions being interconnected electrically through the bulk of the semiconductor material without external leads and with these regions being isolated by at least one slot extending between the flat faces of the semiconductor material and by appropriate discontinuities in the various layers having at least one end terminating in a slot.

A further object of the present invention is to provide a new and improved monolithic semiconductor device comprising within a unitary, multiple layer body of semiconductor material a plurality of active regions, a plurality of energy storage regions made up of reverse biased p-n junctions and a plurality of energy dissipative regions with all of said regions being formed within the body of the material and electrically connected through the body of the material to perform the function of a multi-vibrator and with the different regions being isolated by a minimum number of slots extending through the semiconductor material and by appropriate discontinuities in the various layers, such discontinuities being formed by various operations performed only into the flat faces of the semiconductor material.

A still further object of the present invention is to provide within a new and improved monolithic semiconductor device, such as a multi-vibrator, the time delay function normally served by a parallel resistance-capacitance network, by utilizing within a single p-n junction the capacitance associated with the junction, when reversed biased, and the resistance equivalent of the reverse leakage current of the junction.

Another object of the present invention is to provide a new and improved monolithic semiconductor device comprising within a unitary multiple layer body of a semiconductor material a plurality of energy storage regions made up of reverse biased p-n junction and a plurality of energy dissipative regions with all of said regions being formed within the body of the material and electrically connected through the body of the material to form a frequency dependent network such as a twin T filter with the different regions being isolated by slots extending through the semiconductor material and by appropriate discontinuities in the various layers, such discontinuities being formed by various operations only unite the flat faces of the semiconductor wafer.

The invention, both as to its organization and manner of operation, together with further objects and advantages, will best be understood by reference to the following detailed description taken in conjunction with the accompanying drawings wherein.

Figure 25:
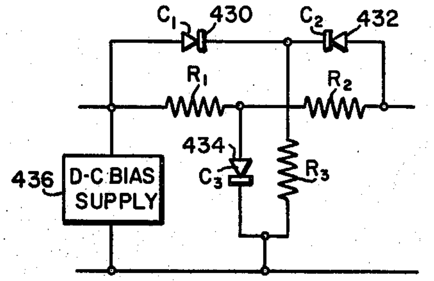
FIG. 25 is a schematic diagram of a twin-T notch filter circuit contained within a unitary block of a semiconductor material.
Figure 26:
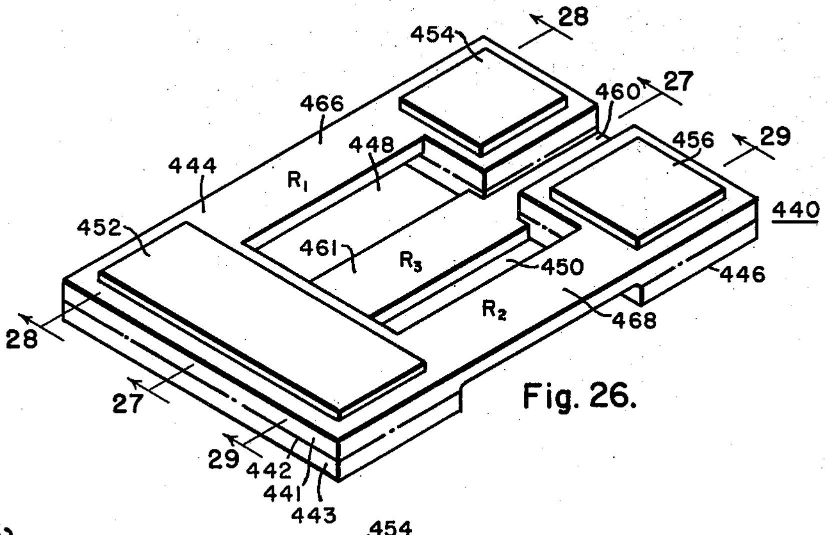
FIG. 26 is a perspective view of a twin-T notch filter built within a unitary block of a semiconductor material.
Figure 28:
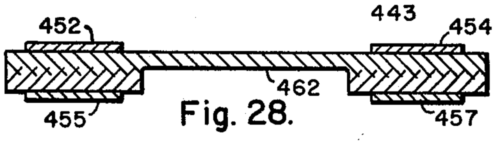
Figure 27:
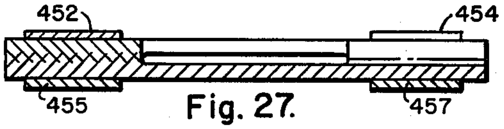
Figure 29:
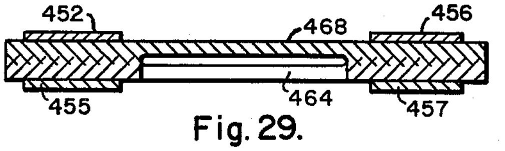
Figure 30:
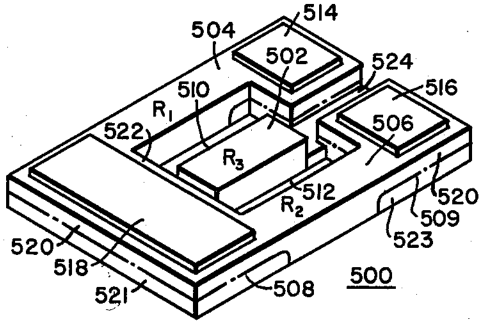
Figure 31:
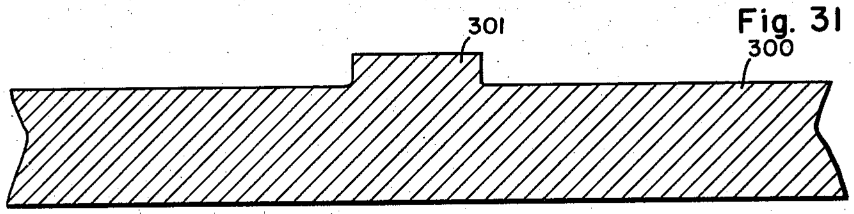
Figure 32:
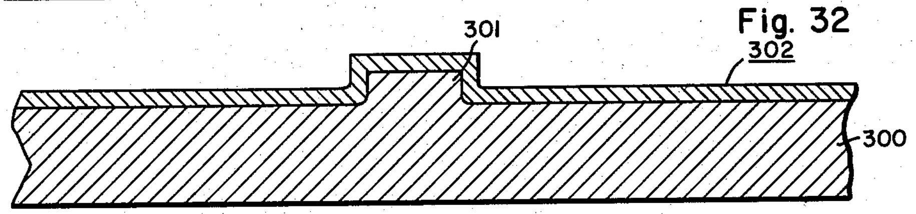
Figure 33:
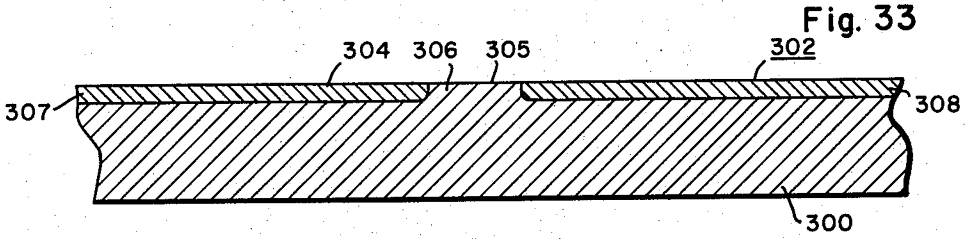
Figures 34, 35, 36, 37:
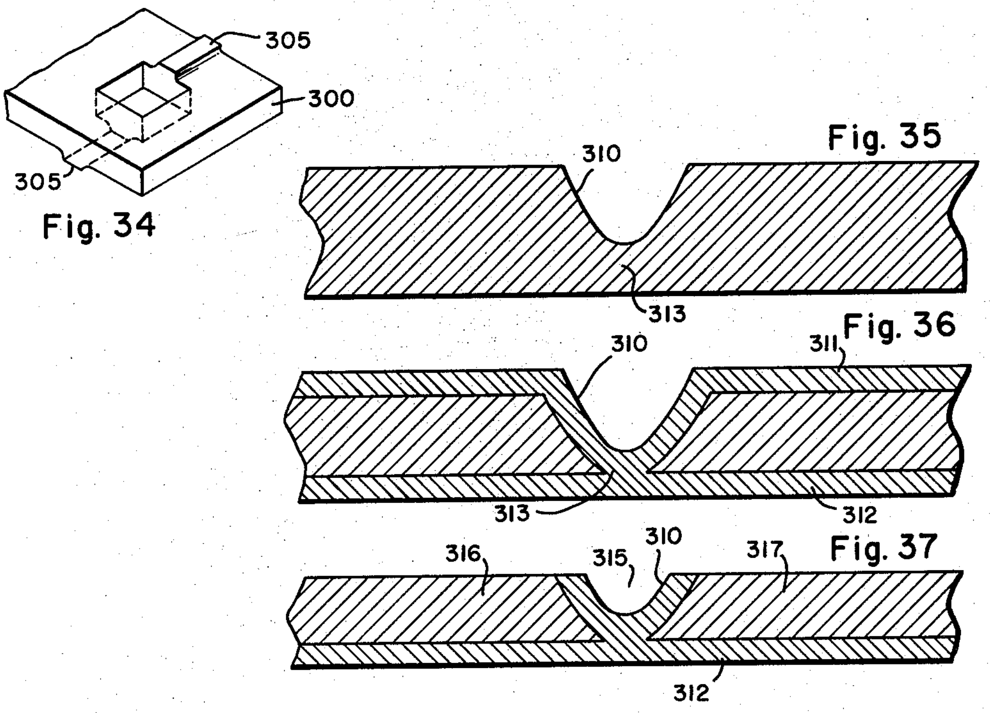

FIGS. 27 to 29 inclusive are sectional views of the block of FIG. 26;

FIG. 30 is a perspective view of a twin-T notch filter built within a unitary block of a semiconductor material;

FIGS. 31 to 33 are cross sectional views illustrating a semiconductor wafer in different stages of processing to form a discontinuity in one of its layers without impairing the rigidity of the wafer;

FIG. 34 is a fragmentary, perspective view illustrating a portion of a monolithic semiconductor device having discontinuities in some of its layers formed by the process illustrated in FIGS. 25 to 27; and FIGS. 35 to 37 are cross sectional views illustrating a semiconductor wafer in different stages of processing to form a discontinuity in one of its layers while at the same time, preserving the rigidity of the wafer.

The foregoing and other objects are realized in accordance with the present invention by providing a monolithic semiconductor device formed from a thin body or wafer of semiconductor material having first and second opposed flat faces and made up of a plurality of layers of different conductivity type lying between the flat faces and cooperating to form at least one p-n junction. The different regions of said wafer which are adapted to perform the functions of the various components of an electronic circuit are isolated from one another (1) by forming one or more slots extending between the flat faces of the wafer and through the junction or junctions and (2) by forming discontinuities in the outer layer or layers of the wafer with each discontinuity having at least one end terminating at a slot. In one technique for practicing the present invention, the discontinuities are formed by troughs or grooves extending into the wafer from either or both of the flat faces; while in a second technique these discontinuities in the outer layer or layers are provided by portions of a layer lying adjacent the outer layer which portions extend through the outer layer to a flat face of the wafer. The second technique of the invention results in a more rigid construction than by the first technique since it does not weaken the wafer in the area where the discontinuity is formed by a third technique or form of the invention, the discontinuities are formed by first forming a relatively shallow groove or trough in a parent crystal or wafer of predetermined conductivity type, by then diffusing into the opposed flat faces at least one of which is provided with a trough, a doping material to form layers respectively lying adjacent the flat faces of different depth to meet in the area lying beneath the deepest part of the trough, and by then removing the layer adjacent each grooved face to expose a layer of the parent crystal having a discontinuity therein formed by the diffused area around the trough. The third form of the invention also results in the production of a relatively rigid wafer since it does not require the use of very deep troughs to effect the desired isolation. Any two or all three of these techniques may be produced in a single semiconductor device.

As a specific example of a monolithic semiconductor device which may be formed by the practice of the present invention, the slot and discontinuity technique is shown as used in constructing a conventional parallel resistance-capacitance network. In other forms of the invention, the slot and discontinuity technique is illustrated for forming a number of different multivibrator circuits. Each such multi-vibrator circuit is formed within a unitary body of semiconductor material containing a plurality of active regions each of which is unstable and regenerative in function, a plurality of energy storage regions formed by reverse biased p-n junctions and a plurality of energy dissipative regions with the active regions and the enery storage regions being interconnected through the body of the semiconductor material and being electrically isolated by the slot and discontinuity technique referred to above. In all cases, the only external leads required for the semiconductor device are the power input leads and the signal output leads but in the event that the multivibrator circuit is to be operated as a triggered multivibrator, an additional signal input lead may be required.

Figure 1:
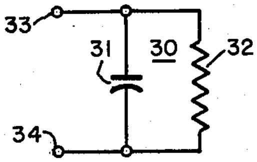
Fig. 1 PRIOR ART
FIG. 1 is a schematic diagram illustrating a conventional, parallel resistance-capacitance network which may be formed from a body of semiconductor material by following the teachings of the present invention.

Referring now to the drawings and first to FIG. 1, a conventional parallel resistance-capacitance circuit is there indicated generally by the reference numeral 30 and is made up of a capacitor 31 connected in parallel with a resistor 32 across a pair of circuit input terminals 33 and 34. By following the teachings of the present invention, the functions of such a circuit may be performed by a unitary, monolithic body of semiconductor material employing only the functions of known components or specific regions which performs desired electronic functions.

For the purpose of clarity, one form of the present invention will be described specifically in terms of preparing the RC circuit shown in FIG. 1 in a semiconductor silicon body. It will be understood, however, that in addition to silicon other semiconductor material such as germanium or a semiconducting compound comprised for example, of stoichiometric portions of elements from Group III of the Periodic Table, for example, gallium, aluminum and indium, and elements from Group V of the Periodic Table, for example, arsenic, phosphorus and antimony, may be used. Examples of suitable Group III–V stoichiometric compounds include gallium arsenside, gallium antimonide, gallium phosphide, indium arsenside and indium antimonide. It will be also understood that the silicon or other semiconductor material may be processed so that the semiconductivity of the various regions may be reversed.

Figure 2:
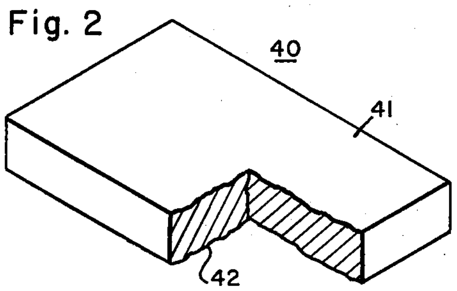
FIG. 2 is a perspective view partly broken away and illustrating a semiconductor wafer or block which may be used in the formation of the circuit illustrated in FIG. 1.

With reference to FIG. 2, there is illustrated a broken away portion af single crystal, silicon wafer 40 of n-type semiconductivity. This wafer is illustrated as being in the form of a thin rectangular block although the rectangular shape is unimportant since the wafer could also be circular or of any other suitable shape. In any event, the wafer includes a pair of opposed parallel flat surfaces 41 and 42 which are illustrated in FIG. 2 as comprising the upper and lower surfaces of the wafer. The surfaces 41 and 42 are separated by the thin layer of semiconductor material making up the block 40. The wafer 40 may be prepared by any of the methods known to those skilled in this art, for example, a single crystal silicon rod may be pulled from a melt comprised of silicon and at least one element from Group V of the Periodic Table, for example, arsenic, antimony or phosphorus. The wafer 40 is then cut from the rod in any suitable manner, for example, by using a diamond saw. The cut surface of the wafer may then be lapped or etched or both in order to produce a smooth surface after sawing. In addition, the semiconductor device of this invention may be prepared from a section of a dendritic crystal prepared in accordance with United States patent application Serial No. 844,288, filed Otober 5, 1959, the assignee of which is the same as that of the present invention.

Since the bulk of the wafer makes up the dissipative or resistance regions of the finished semiconductor device, it is desirable that the silicon wafer 40 have a resistivity of from 1 ohm centimeter to 10 ohm centimeters and preferably about 5 ohm centimeters. The area of the wafer 40 is largely determined by the required capacitance of the reverse biased junction to be used to simulate the action of the capacitor 31 in the circuit shown in FIG. 1.

A layer of opposite conductivity type from the starting wafer 40 may be formed in any conventional manner as, for example, by diffusion into one surface of the wafer a doping material which will change the conductivity type of the diffused layer. In the case of the n-type wafer 40, such diffusion may be accomplished by disposing the wafer in a diffusion furnace which has its hottest zone at a temperature within the range of 1100° C. to 1250° C. and has an atmosphere of the vapor of an acceptor doping material, for example, indium, gallium, aluminum or boron. The zone of the furnace within which a crucible containing such acceptor impurity lies may be at a temperature from 600° C. to 1250° C., the specific temperature being chosen to insure the desired vapor pressure of diffusant from the crucible so that the acceptor impurity will diffuse into the surface of the n-type wafer. Since the acceptor impurity will normally diffuse into all exposed sides or surfaces of the wafer, it may be necessary to mask those sides or surfaces through which no diffusion is desired. Alternatively, the acceptor impurity may be allowed to diffuse through all of the surfaces of the wafer and then the wafer may be abraded or etched, or both, in order to remove the diffused layer or layers from the undesired portions of the wafer.

Figure 3:
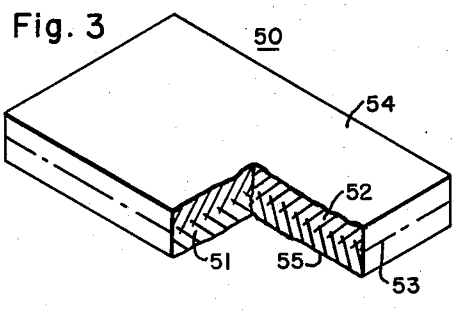
FIG. 3 is a perspective view similar to FIG. 2 but illustrating the wafer being processed in accordance with the teachings of this invention.

With reference to FIG. 3, there is illustrated a wafer 50 which is the n-type wafer of FIG. 2 after diffusion of a doping impurity through the top surface only of the wafer or where the diffused layer has been removed from all but the top portion of the wafer. The wafer 50 is made up of a lower n-type layer 51 and an upper p-type layer 52 formed by the diffused impurity area. There is a p-n junction 53 formed at the boundary between the layers 51 and 52 and intermediate the top surface 54 and the bottom surface 55 of the wafer.

The depth or thickness of the p-type layer 52 is dependent primarily upon the desired design characteristics of the completed RC circuit 30. In addition, this region must be deep enough to permit the alloying or fusion of an ohmic contact to the top surface 54 without penetration entirely through the p-type layer 52 to the n-type layer 51.

Figure 4:
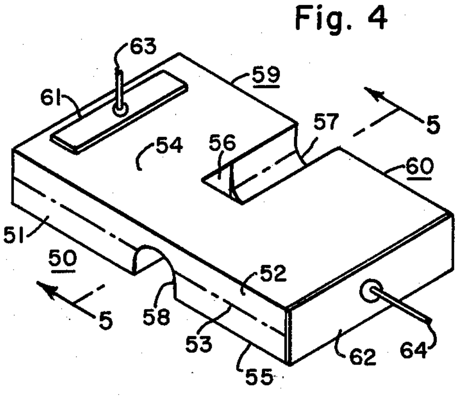
FIG. 4 is a perspective view illustrating a wafer shown in FIGS. 2 and 3 being further processed in accordance with the present invention.

Referring next to FIG. 4, it will be observed that the wafer 50 is there shown after further treatment to form a slot or hole 56 extending through the junction 53 between the flat parallel faces 54 and 55 of the wafer. In the form shown in FIG. 4, a discontinuity in the layer 52 is formed by a groove or trough 57 extending inwardly of the wafer from the top surface 54 entirely through both the p-type layer 52 and the junction 53 with the inner end of the trough extending into but only partially through the n-type layer 51. The trough 57 terminates at one end of the slot or hole 56 and extends across a portion of the wafer top surface toward a side edge of the wafer. A second discontinuity in the layer 51 is formed by another trough 58 extending inwardly from the bottom surface 55 and penetrating entirely through the n-type layer 51 and the junction 53 with the upper end of the trough protruding into the p-type layer 52. The trough 58 also terminates at the one end at the slot or hole 56 and extends away from this hole toward the other side edge of the wafer. The grooves or troughs 57 and 58 may be formed in any suitable manner as, for example, by sand blasting through a suitable mask or by ultrasonic drilling but, since both of these techniques leave roughened surfaces which require further treatment, the grooves are preferably formed by etching. To this end, the surfaces of the wafer 50 including the top surface 54 and the bottom surface 55 are coated with an acid resisting masking material for example, Apiezon wax. A portion of the masking material is removed from the area of the top surface 54 where the groove or trough 56 is to be formed and a similar portion is removed from the bottom surface 55 where the trough 58 is to be formed. This may be accomplished by the use of a suitable scribe. The coated wafer 50 with the two surface portions exposed is then etched with a suitable silicon etchant, for example, an etchant comprised of, all parts by volume three parts of nitric acid, one part hydrofluoric acid and one part acetic acid. The etching is continued until the scribed areas in the regions of the grooves or troughs 57 and 58 are etched to the desired depths. In the event that grooves or troughs of different depths are desired, one of the troughs is partially etched before the masking material is removed in the region of the other trough with the result, of course, that the area which is exposed to the etchant for the greatest time has a deeper groove or trough formed therein. After the etching has been completed, the masking material is removed from the surfaces of the wafer.

The troughs 57 and 58 have overlapping portions which in the form of the invention shown in FIG. 4 lie near the center of the wafer. Thus, when these two grooves are etched to the indicated depths, the overlapping portions form the hole 56 which extends entirely through the wafer thickness between the faces 54 and 55. The hole 56 and the troughs 57 and 58 cooperate in a manner which will be described more fully hereinafter to divide the wafer into two regions respectively indicated at 59 and 60 and to provide isolation between these two regions.

An ohmic contact 61 is secured to the top surface 54 of the wafer at one end of the region 59 while a second ohmic contact 62 is secured to an edge at the opposite end of the wafer in the region 60. The ohmic contact 62 spans or bridges the n-type layer 51 and the p-type layer 52 to provide a short circuit across the junction 53 in the region 60. These ohmic contacts are secured to the wafer in conventional manner as by alloying or compression bonding and, hence, the manner in which they are formed will not be described in detail. Leads 63 and 64, which are respectively secured to the ohmic contacts 61 and 62 as, for example, by soldering, serve as the external circuit connections and correspond to the terminals 33 and 34 of the circuit shown in FIG. 1. The p-n junction in the region 59 between the n-type layer 51 and the p-type layer 52 is reverse biased to form an energy storage region which performs the function of the capacitor 31 in the circuit illustrated in FIG. 1. The area of the layers in the region 59, the type of material, etc. may be selected to provide the desired capacitance. The energy storage region 59 is connected to the region 60 through thin connecting portions of the wafer remaining after the troughs 57 and 58 are formed. The resistivity of the semiconductor material in one of these thin connecting portions thus provides a shunt resistance across the p-n junction of the region 59 and, hence, acts as an energy dissipative region for performing the function of the resistor 32 of the circuit illustrated in FIG. 1. The depth of the appropriate trough may be selected to provide the desired resistance.

Figure 5:
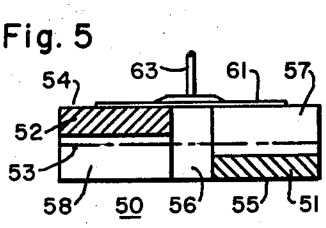
FIG. 5 is a sectional view taken along a line substantially corresponding to the line 5—5 in FIG. 4.

It will, therefore, be observed that the monolithic semiconductor device illustrated in FIGS. 4 and 5 is capable of performing the functions of the circuit shown in FIG. 1. The regions 59 and 60 are effectively isolated by the slot 56 and the discontinuities 57 and 58 but both the slot and the troughs are formed exclusively by cutting into the flat upper or lower faces of the wafer and without requiring the drilling of passages or the like extending parallel to the flat faces between the two sides or the two ends of the wafer. Ohmic alloyed foils may be applied to any desired surfaces to reduce spreading resistance by providing a very highly doped regrowth region to effectively short out the bulk.

The slot and discontinuity method of obtaining region isolation may, of course, be used to construct monolithic semiconductor devices performing functions other than that of the simple RC circuit shown in FIG. 1. For example, this principle may be used in the construction of devices for performing the function of a free-running multi-vibrator of the type illustrated schematically in FIG. 6. As will be recognized by those skilled in this art, the circuit there shown is of conventional construction and functions essentially as a non-sinusoidal two-stage oscillator having one stage in the conducting state while the other stage is cut off until a point is reached where the stages reverse their conditions, that is, the stage which had been conducting cuts off while the stage which had been cut off begins to conduct. Briefly considered, the circuit shown in FIG. 6 includes a pair of transistors $T_1$ and $T_2$ which are generally similar in construction but, because of slight variations in characteristics, one transistor will conduct sooner than or more heavily than the other in response to the introduction of a negative D.C. voltage at the terminal 70. Let it be assumed, for example, that the transistor $T_1$ initially conducts sooner than or more heavily than the transistor $T_2$ so that the voltage at the collector terminal 71 becomes more positive than the negative voltage at the terminal 70 while, at the same time, the voltage at the base of the transistor $T_2$ becomes more positive. The positive going voltage at the base of the transistor $T_2$ causes a decrease in the current flow through the transistor $T_2$ with the result that the voltage drop appearing across resistor 72 in the collector circuit of the transistor $T_2$ drops and the voltage at the collector terminal 73 becomes more negative. The voltage at the base of the transistor $T_1$ is thus driven in a negative direction to cause a further increase in the current through the transistor $T_1$. The described action takes place very rapidly so that the current through the transistor $T_1$ builds up almost instantaneously to a maximum value while the current through the transistor $T_2$ becomes negligible. When the transistor $T_1$ conducts at the maximum level, the capacitor 76 begins to charge from the D.C. supply through the resistors 72 and 75 while the capacitor 74 begins to discharge through its shunt resistor 69 until the base of the transistor $T_2$ becomes sufficiently negative with respect to the emitter of this transistor to start the conduction of current through the transistor $T_2$. During the period of discharge of the condenser 74, the voltage at the terminal 71 remains substantially constant and at its most positive value. When the transistor $T_2$ begins to conduct the voltage at the junction 73 becomes more positive and, as a result, the voltage at the base of the transistor $T_1$ also becomes more positive so that the current flow through the latter transistor decreases. The decrease in the emitter to collector current of the transistor $T_1$ causes the voltage at the junction point 71 to become less positive and, as a result, the base of the transistor $T_2$ is driven in a negative direction to cause the current flow through the transistor $T_2$ to increase still further. The cumulative action of the voltage increase at the point 73 and the voltage decrease at the point 71 causes a rapid shift of the transistor $T_2$ to the level where it conducts maximum current and, at the same time, causes the transistor $T_1$ to be driven almost instantaneously to cutoff. With the transistor $T_2$ conducting the capacitor 74 begins to charge from the D.C. supply through resistors 77 and 78 while the capacitor 76 begins to discharge through its shunt resistor 79. Current conduction is again initiated in transistor $T_1$ when the capacitor 79 discharges to a level where the base of the transistor $T_1$ is sufficiently negative to cause current flow through the latter transistor. During the period of discharge of the capacitor 76, the voltage at the junction point 73 remains substantially constant and at its most positive level. Thus, if an oscilloscope is connected between the junction point 73 and ground, it will exhibit on its screen a square wave output of the type illustrated in FIG. 7.

Figure 6:
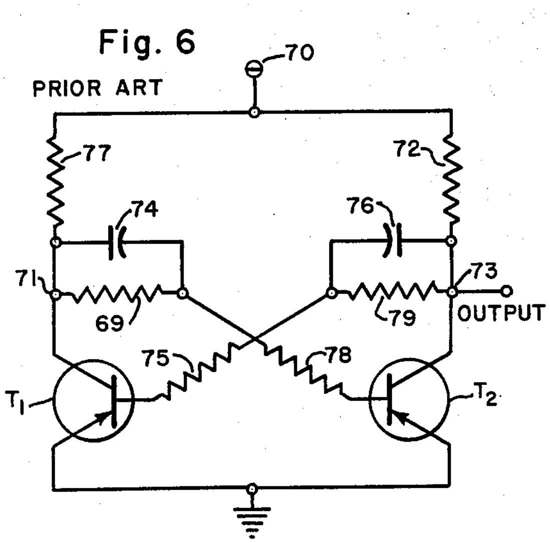
Fig. 6 PRIOR ART
FIG. 6 is a schematic diagram illustrating a conventional multi-vibrator circuit.
Figure 7:
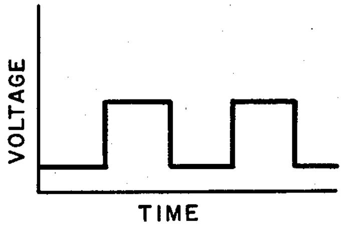
FIG. 7 is a plot of the output voltage waveform from the circuit shown in FIG. 6.

In accordance with the present invention, the entire function of the multi-vibrator circuit shown in FIG. 6 may be built into a unitary monolithic body of semiconductor material in wihch all leads are eliminated except for the power input and the signal output leads. To this end, in one form of the invention shown in FIGS. 8 to 16, a three layer semiconductor junction device is first formed in any well known manner as, for example, by beginning with a block of semiconductor material indicated in FIG. 8 by the reference numeral 80 and by diffusing into the upper and lower surfaces of this block an impurity to form upper and lower layers of opposite conductivity type as indicated in FIGS. 9 and 10. Here again, the block 80 may be formed of any of the conventional semiconductor materials such as silicon or germanium or a semiconducting compound of the type described above formed of stoichiometric proportions of elements from Groups III and V of the periodic table such as, gallium arsenide, gallium antimonide, gallium phosphide, indium arsenide and indium antimonide.

Figure 8:
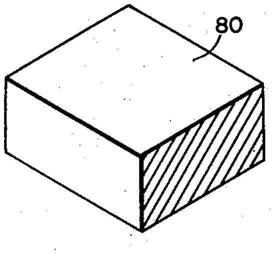
FIGS. 8, 9, 10 and 11 are fragmentary, perspective views illustrating a wafer of semiconductor material being processed in accordance with the teachings of the present invention to form a monolithic semiconductor device for performing the functions of the circuit illustrated in FIG. 6 with FIGS. 8, 9 and 10 illustrating only the left half of the block shown in FIG. 11.
Figure 9:
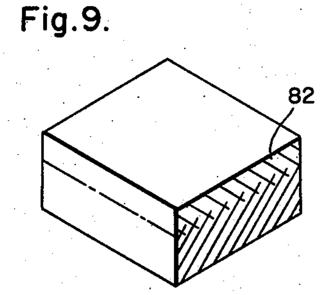
Figure 10:
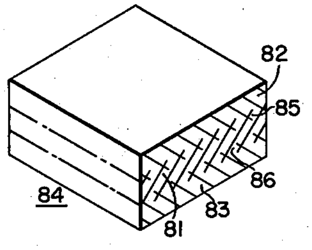
Figure 11:
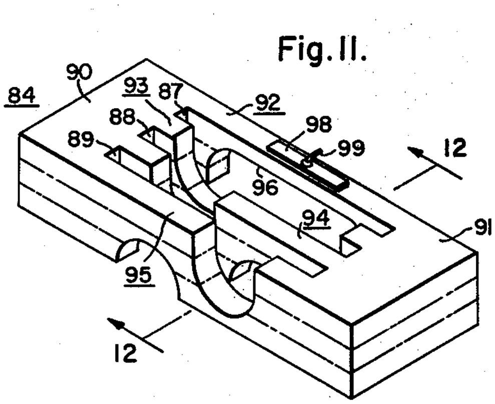
Figure 12:
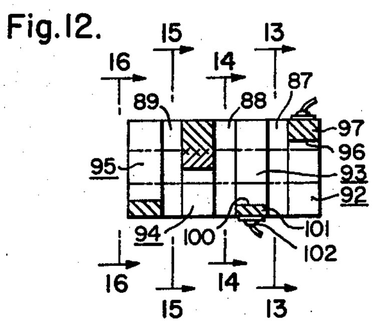
FIG. 12 is a sectional view taken along a line substantially corresponding to the line 12—12 in FIG. 11.

In the form illustrated in FIGS. 8 to 10, the starting wafer or block 80 takes the form of a single crystal germanium wafer of n-type semiconductivity when may be prepared by any of the methods well known to those skilled in the art as described above for the preparation of the wafer 40. Here again the wafer 80 preferably has a relatively high resistivity of from 1 ohm centimeter to 10 ohm centimeters since the material of this wafer forms the base regions of the two transistors. An acceptor type doping material is then diffused into the upper and lower surfaces of the wafer 80 in the manner previously described in order to form a three layer junction device having a center n-type layer 81, an upper p-type layer 82 and a lower p-type layer 83. The diffusion may be carried out in two steps if the p-type layers 82 and 83 are to be doped differently. Here again, the two sides and the ends of the block or wafer 80 may be masked to prevent diffusion into these surfaces, or, in the alternative, the acceptor impurity may be allowed to diffuse through all of the wafer surfaces and the undesired portions may be removed from the two sides and the two ends.

After the diffusion of the acceptor doping material into the upper and lower wafer surfaces, the junction device formed is of the type shown in FIG. 10 and indicated by the reference numeral 84, where a center n-type conductivity layer 81 is illustrated as being disposed between the upper and lower diffused p-type conductivity layers 82 and 83 thus forming a pair of p-n junctions 85 and 86. The junction device 84 is then treated to form three parallel, spaced apart, longitudinal slots or holes 87, 88 and 89 which extend entirely through the wafer between its opposed flat faces and effectively divide the wafer into a first end portion 90 and a second end portion 91 interconnected by four parallel legs 92, 93, 94 and 95. Each end portion forms an active region made up of three layers of alternating conductivity types with these regions 90 and 91 respectively acting to perform the functions of the transistors $T_1$ and $T_2$ in the circuit shown in FIG. 6. In each active region the center n-type layer 81 forms a base layer, the upper p-type layer 82 forms an emitter layer and the lower p-type layer 83 forms a collector layer with the different layers being interconnected through the parallel legs 92, 93, 94 and 95.

The slots or holes 87, 88 and 89 may be formed in any suitable manner as, for example, by sandblasting through an appropriate mask, by ultrasonic drilling or by etching. Since both the sandblasting and the ultrasonic drilling processes require a clean up operation to remove the rough or abraded surfaces, the formation of the slots by etching is preferred. This is accomplished by coating the entire surface of the block 84 with an etchant resisting material of the type described above and by then removing from each of the upper and lower surfaces three portions of the masking material where the grooves 87, 88 and 89 are to be formed. The masked block with the exposed portions is then placed in a germanium etchant material of the type previously described and the etching is carried out until three slots are formed extending entirely through the thickness of the wafer 84 between its upper face and its lower face. Each of the parallel legs 92, 93, 94 and 95 is then provided with at least one discontinuity formed by a groove or trough having one or both ends terminating at the adjacent slot or slots.

Figure 13:
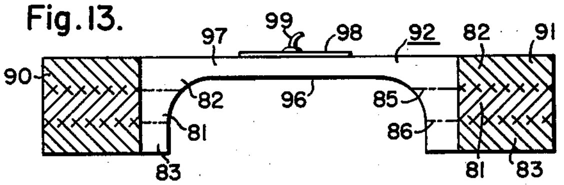
FIGS. 13 to 16 are sectional views respectively taken along the lines 13—13, 14—14, 15—15 and 16—16 of FIG. 12 assuming, of course, that the latter shows the entire construction of the semiconductor device.

More specifically, as is best shown in FIG. 13 of the drawings, the leg 92 is provided with an elongated groove or trough extending from the bottom surface of the wafer or block 84 through the lower p-type layer 83, through the center n-type layer 81 and into but only partially through the upper p-type layer 82 thus leaving only a connecting portion 97 of the leg 92 extending between the emitter layers of the two end transistor regions 90 and 91. An ohmic contact 98 is secured in conventional manner to the arm 92 near the center of the top surface of the connecting portion 97. A lead 99 is attached to this ohmic contact as, for example, by soldering, for connection to the positive or ground terminal of a suitable D.C. source which supplies the operating potentials for the semiconductor device. This connection corresponds to the grounded emitter connection of the circuit shown in FIG. 6. Since the emitters of the transistors $T_1$ and $T_2$ are connected directly together, a low resistance connection is desired between the two emitter layers of the active regions 90 and 91 and, to this end, the trough 96 extends only slightly beyond the junction 85 into the p-type layer 82 thus forming a relatively thick connecting portion having relatively low resistance.

Figure 14:
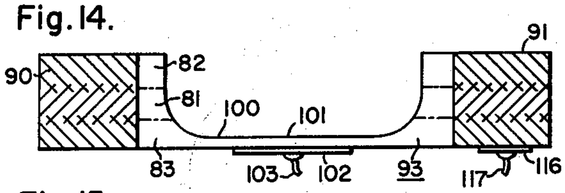

Similarly, as is best shown in FIG. 14, the leg 93 is provided with an elongated groove or trough 100 which extends downwardly from the upper surface of the block or wafer 84 through the upper p-type layer 82, through the p-n junction 85, through the center n-type layer 81, through the p-n junction 86 and relatively far into the lower p-type layer 83 thus leaving only a very thin portion 101 of the leg 93 to connect the collector layers of the two end transistor regions 90 and 91. Since the trough 100 is somewhat deeper than the trough 96 described above, the connecting portion 101 is much thinner than the corresponding connecting portion 97 of the leg 93 and, as a result, the connecting portion 101 provides a relatively high resistance connection between the collector layers of the end regions 90 and 91. The thin, high resistance connecting portion 101 thus provides energy dissipative regions to perform the functions of the resistors 72 and 77 of the circuit shown in FIG. 6. An ohmic contact 102 is connected in conventional manner to the center of the bottom surface of the connecting portion 101 so that a lead 103 soldered or otherwise secured to this ohmic contact may be attached to the negative terminal of the D.C. power supply. Thus, the ohmic contact 102 corresponds to the terminal 70 of the circuit shown in FIG. 6.

Figure 15:
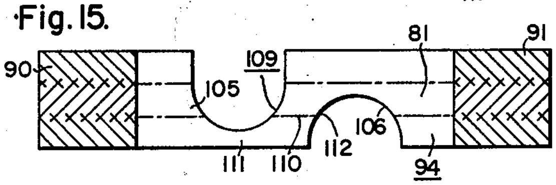

In FIG. 15, the leg 94 is provided with a relative deep groove or trough 105 located near the transistor region 90 and extending from the top surface of the wafer through the upper p-type layer 82, through the p-n junction 85 through the center n-type layer 81, through the p-n junction 86 and into but not through the lower p-type layer 83. The leg 94 is also provided with a second, somewhat shallower groove or trough 106 formed between the transistor region 91 and the deeper groove 105 and extending from the bottom surface of the wafer through the lower p-type layer 83, through the p-n junction 86 and into but only partially through the center n-type layer 81.

Figure 16:
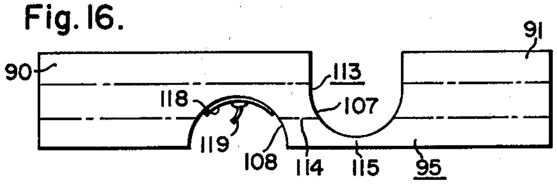

As shown in FIG. 16, the leg 95 is also provided with a relatively deep groove or trough 107 similar to the groove 105 and a somewhat more shallow groove 108 similar to the groove 106 but, in this case, the deep groove is located adjacent the transistor region 91 while the shallow groove 108 is located near the transistor region 90.

In leg 94, the two grooves 105 and 106 cooperate to form a connecting portion indicated at 109 which portion includes a p-n junction 110 formed between the base layer 81 and the collector layer 83. The operating potentials supplied to the transistor regions naturally bias the p-n junction 110 in the reverse direction so that this junction forms an energy storage region to perform the function of the capacitor 74 shown in FIG. 6. The deep trough 105 forms a thin connecting portion 111 between the energy storage region 109 and the collector layer of the transistor region 90. The depth of this trough 105 may be controlled to provide any desired resistance in the thin portion 111 of the leg 94 so that the latter portion serves as an energy dissipative region to perform the function of the resistor 78 shown in FIG. 6. The surface of the trough 105 or 106 in the region of the p-n junction 110, that is, in the region indicated at 112 in FIG. 15, may be modified in conventional manner to control the surface leakage or shunt resistance across the p-n junction in order to simulate the action of the shunt resistor 69 illustrated in FIG. 6.

In view of the foregoing description, it will be recognized that in leg 95, as shown in FIG. 16, the troughs 107 and 108 cooperate to form a connecting portion 113 between the base layer of the transistor region 90 and the collector layer of the transistor region 91 which connecting portion again includes a p-n junction 114 naturally reverse biased by the operating potentials supplied to the transistor regions. The reverse biased p-n junction 114, of course, forms an energy storage region of the semiconductor device to perform the function of the capacitor 76 of the circuit shown in FIG. 6. The depth of the groove 107 may again be controlled to provide a narrow connecting portion 115 forming an energy dissipative region to perform the function of the resistor 75 in the circuit shown in FIG. 6. The surface of the grooves 108 or 107 may again be treated or modified to control the surface leakage or shunt resistance across the p-n junction 114 thus simulating the function of the shunt resistor 79 illustrated in FIG. 6.

An output connection may be taken from the collector layer of either transistor region to provide a square wave output signal. The particular collector layer to which the output connection is made will depend upon the desired phase of the output signal but, in the form shown, the connection is made to the collector layer of the region 90 by means of an ohmic contact 116 secured in conventional manner to the bottom surface of the lower p-type layer 83 as shown in FIG. 14. An output lead 117 may be soldered or otherwise secured to the ohmic contact 116 to permit supply of the output signal to another circuit. The circuit as thus far described will operate as a free-running multivibrator of the type illustrated schematically in FIG. 6 and its operation will be obvious in view of the foregoing description.

If a triggered multi-vibrator is desired a connection must be made to supply an input or triggering signal to the base of either one of the transistors $T_1$ or $T_2$, the particular connection selected being dependent, of course, upon the desired phase relationship between the available triggering signal and the output signal. Such an input connection may be made to the monolithic semiconductor device illustrated in FIGS. 11 to 16 by means of an ohmic connection to the base layer in the desired region 90 or 91. In the alternative, this connection may be made to the base layer at the inner portion of the shallow groove. Thus, if it is desired to trigger the transistor region 90, the trigger input signal may be supplied to the base layer of this region through an ohmic contact 118 secured to the innermost area of the shallow groove 108 as is illustrated in FIG. 16. An input signal is supplied to this ohmic contact through a lead 119. Similarly, if it is desired to trigger the transistor region 91, the input signal may be supplied through an ohmic contact secured at the inner end of the trough 106 although such a contact is illustrated in the drawings.

Figure 17:
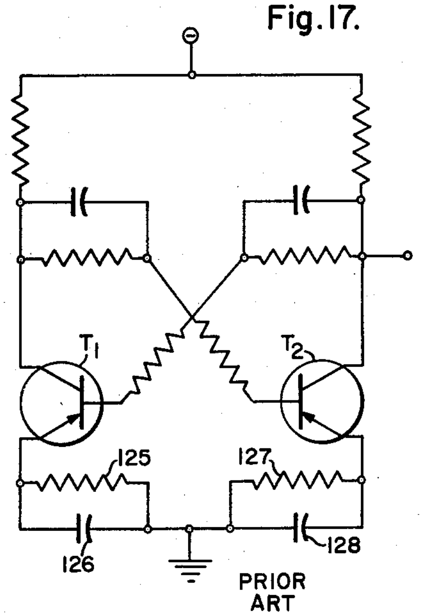
FIG. 17 is a schematic diagram illustrating a multi-vibrator circuit similar to that shown in FIG. 6 but employing a parallel RC circuit in the emitter circuit of each transistor.

In another form of conventional multi-vibrator circuit illustrated in FIG. 17, a parallel RC network is connected between each of the transistor emitters and ground. The circuit shown in FIG. 17 is identical to that illustrated in FIG. 6 except that the former employs a resistor 125 and a capacitor 126 connected in parallel between the emitter of the transistor $T_1$ and ground and also employs a similar resistor 127 and capacitor 128 connected between the emitter of the transistor $T_2$ and ground.

Figure 18:
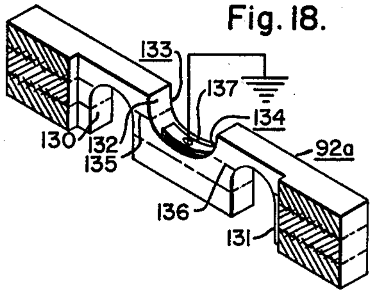
FIG. 18 is a fragmentary, perspective view illustrating the manner in which the block shown in FIG. 11 may be modified to form a monolithic semiconductor device for performing the functions of the multi-vibrator circuit illustrated in FIG. 17.

FIG. 18 illustrates the manner in which the monolithic semiconductor device shown in FIGS. 11 to 16 may be modified to perform the functions of the circuit shown in FIG. 17. More specifically, FIG. 18 illustrates a modified construction of the leg 92 in order to provide the functions of the RC circuits shown in FIG. 17. Thus, in FIG. 18 a leg 92a is illustrated which is adapted to replace the leg 92 of the monolithic semiconductor device shown in FIGS. 11 to 16, the remainder of the monolithic semiconductor device in which the leg 92a is connected being, in all other respects, identical to that shown in FIG. 11 and described above. The leg 92a is provided with a pair of discontinuities in the form of relatively deep troughs or grooves 130 and 131 and another discontinuity comprising a somewhat more shallow trough or groove 132. Each of the deep troughs 130 and 131 extends from the bottom surface of the wafer through the lower p-type layer, through the center n-type layer and into but only partially through the upper p-type layer. The shallow trough 132 extends from the upper surface of the wafer through the upper p-type layer and into but not through the center n-type layer. These three troughs form a pair of connecting portions 133 and 134 which respectively include p-n junctions 135 and 136. These junctions are reverse biased by the operating voltage across the transistors 90 and 91 to form energy storage regions performing the functions of the capacitors 126 and 128 illustrated in FIG. 17. Here again, the surfaces of the troughs 130, 131 and 132 in the regions of the junctions 135 and 136 may be modified or treated by conventional techniques to control the surface leakage or shunt resistance in order to perform the functions of the resistors 125 and 127 of the circuit shown in FIG. 17. The ground connection for the emitter circuit is made via an ohmic contact 137 secured to the leg 92a between the connecting portions 133 and 134. More specifically, the ohmic contact 137 is secured to the inner or deep portion of the shallow trough 132 by conventional alloying techniques or by other methods such as thermo-compression bonding to form a connection to the center or base layer. A grounded lead is then secured to the ohmic contact 137 in conventional manner as, for example, by soldering.

Figures 19, 20:
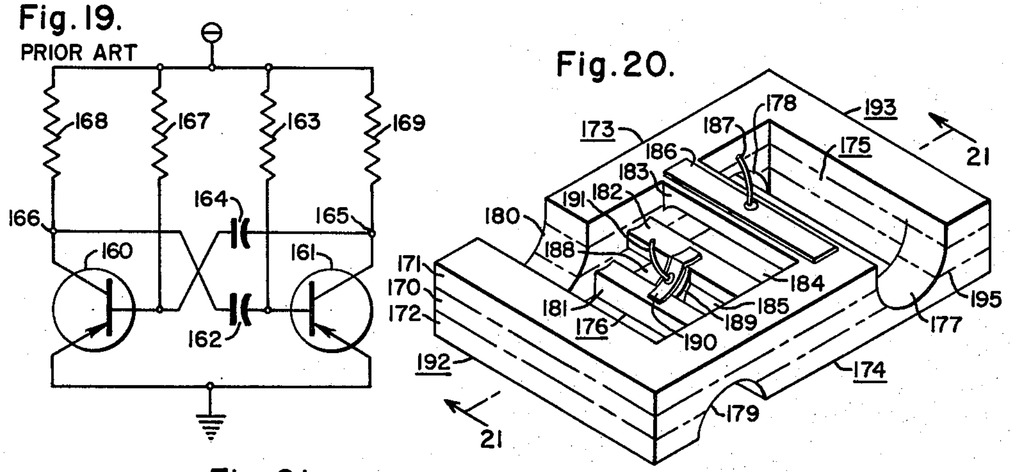
Fig. 19. PRIOR ART Fig. 20.
FIG. 19 is a schematic diagram illustrating another conventional multi-vibrator circuit the functions of which can be performed by a monolithic semiconductor device constructed in accordance with the teachings of the present invention.
FIG. 20 is a perspective view illustrating a monolithic semiconductor device constructed in accordance with the present invention to perform the functions of the multi-vibrator circuit shown in FIG. 20.

Still another type of conventional multi-vibrator circuit which is well known to those skilled in this art is illustrated in FIG. 19. The operation of this multivibrator circuit is well known and will not be described in detail. However, it will be recognized that the circuit includes a pair of transistors 160 and 161 which again possesses slightly different characteristics in order to start the oscillation of the circuit. During the period when the transistor 160 is conducting its maximum current the capacitor 162 is discharging through resistors 163 and 168 while the capacitor 164 charges relatively fast due to the difference in time constants of the respective charging and discharging circuits. When the capacitor 162 discharges sufficiently to drive the voltage at the base of the transistor 161 to a point where the emitter to collector current begins to flow through the latter transistor the transistors reverse their conditions in well known manner. Thus, the start of current flow through the transistor 161 drives the voltage at the point 165 more positive thus increasing the voltage at the base of the transistor 160. The increase in base voltage of the transistor 160 causes the current flow in the emitter to collector circuit of the latter transistor to decrease thus driving the voltage at the point 166 in a negative direction and decreasing still further the base voltage of the transistor 161 to further increase the current flow through the latter transistor. The combined effect is to cause a rapid changeover of the transistor 160 from its conducting condition to its cutoff condition and, at the same time, to cause the transistor 161 to rapidly reverse from the cutoff condition to the conducting condition. During the period when the transistor 161 is conducting maximum current, the capacitor 164 discharges through the resistors 167 and 169 while the capacitor 162 charges relatively fast through the resistor 168. As soon as the voltage at the base of the transistor 160 becomes sufficiently negative to cause conduction through the latter transistor, the circuit again reverts to its original condition where the transistor 160 is conducting and the transistor 161 is cut off in a manner which will be obvious.

Figure 21:
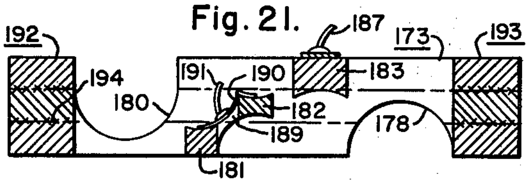
FIG. 21 is a sectional view taken along a line substantially corresponding to the line 22—22 in FIG. 21.

In accordance with the present invention a monolithic semiconductor device as illustrated in FIGS. 20 and 21 may be constructed to perform the functions of the circuit shown in FIG. 19. This is accomplished by again forming a three layer wafer or block of semiconductor material in exactly the same manner as was described above to form the block 84. Thus, the wafer is formed with a center n-type or base region 170, an upper emitter or p-type region 171 and a lower collector or p-type region 172. The wafer is provided with slots and troughs described more fully below which isolate two active transistor regions 173 and 174 at the opposite sides of the wafer. Each of these active regions comprises a three layer transistor region made up of a center n-type layer of semiconductor material interposed between upper and lower p-type layers so that the two regions 173 and 174 perform the functions of the transistors 160 and 161 in the circuit shown in FIG. 19.

To provide the desired isolation between the regions 173 and 174 the wafer is first provided with a group of five holes or slots 175, 176, 184, 185 and 188 extending entirely through the thickness of the wafer between its upper and lower faces. These slots or holes are formed in the manner described above by any suitable technique, such as, by sandblasting, by ultrasonic drilling or, as is preferable, by etching. Discontinuities in the form of troughs 177, 178, 179 and 180 are then formed in the wafer with the troughs 177 and 178 each having one end terminating at the hole 175 and with the troughs 179 and 180 having one end terminating at the hole 176. The troughs 177 and 180 extend from the upper surface of the wafer through the upper p-type emitter layer, through the center n-type base layer and into but not through the lower p-type collector layer. The troughs 178 and 179 are somewhat shallower than the troughs 177 and 180 and extend from the bottom surface of the layer through the lower p-type collector layer and into but not through the center n-type base layer.

The formation of the holes 175, 176, 184, 185 and 188 also forms three connecting portions extending between the active regions 173 and 174 and having a thickness equal to that of the original wafer. Two of these connection portions are joined near their centers by an arm which lies between the holes 185 and 188 and which is also equal in thickness to the original wafer. The three connecting portions and the arm are then reduced in thickness by etching or sandblasting to form a first leg 181 connecting the two collector layers of the active regions 173 and 174, a second leg 182 connecting the two base layers of the active regions and a third leg connecting the two emitter layers.

More specifically, the leg 183 is formed by etching from the underside of the connecting portion through both the collector layer and the base layer, thus leaving only an upper leg which effectively forms a relatively narrow continuation of the emitter layer and extends between the two regions 173 and 174. An ohmic contact 186 is secured to the upper face of the leg 183 and is of such length that it extends between and slightly over the two regions 173 and 174, thus providing a direct connection between the two emitter layers. A grounded lead is secured to the center of the ohmic contact 186 in any suitable manner as, for example, by soldering to form the grounded emitter connection of the circuit shown in FIG. 19.

The leg 182 is formed by etching both from the top and bottom surfaces of the wafer with the top surface being etched entirely through the upper p-type emitter layer and with the bottom surface being etched entirely through the lower p-type collector layer thus leaving a relatively thin leg effectively forming a continuation of the base layer and extending between the base portions of the two active regions 173 and 174.

The leg 181 is formed by etching from the top surface of the wafer entirely through the upper emitter layer and through the center base layer thus leaving only a thin, narrow leg extending between the collector layers of the two regions 173 and 174.

The etching process employed to form the connecting legs 181 and 182 also reduces the thickness of the arm lying between the holes 185 and 188 and, hence, leaves a small connecting portion 189 extending between the two legs 181 and 182 near their centers. An omhic contact 190 is secured to the connecting portion 189 and is of sufficient length to extend partially over a portion of each of the legs 181 and 182. A suitable connector 191 is attached to the ohmic contact 190 and leads to the negative terminal of the D.C. power supply which supplies operating potential for the semiconductor device. The thickness of the leg 182 may be controlled to provide any desired resistance between the ohmic contact 190 and each of the base layers of the two active regions 173 and 174. Thus, the two portions of the legs 182 lying on opposite sides of the ohmic contact 190 serve as energy dissipative regions and perform the functions of the resistors 163 and 167 of the circuit shown in FIG. 19. Similarly, the thickness of the leg 181 may be controlled to provide any desired resistance between the ohmic contact 190 and each of the collector layers of the regions 173 and 174. Here again, the two regions of the legs 181 lying on opposite sides of the ohmic contact 190 serve as energy dissipative regions to perform the functions of the resistors 168 and 169 of the circuit illustrated in FIG. 19.

The two end regions 192 and 193 of the semiconductor device shown in FIGS. 20 and 21 serve as energy storage regions to perform the functions of the capacitors 162 and 164 of the circuit shown in FIG. 19. The end region 192 is isolated from the two active or transistor regions 173 and 174 by the troughs 179 and 180 while the end region 193 is isolated from these two transistor regions by the troughs 177 and 178. The troughs 179 and 180 cooperate to connect the base layer of the region 174 to the collector layer of the region 173 through a p-n junction 194 (FIG. 1). Since the collector to base layer is naturally reverse biased by the operating potentials supplied to the transistor regions, the region 192 including the p-n junction 194 serves as an energy storage region to perform the function of the capacitor 162 of the circuit illustrated in FIG. 19.

In similar manner, the base layer of the active transistor region 173 is connected through the region 193 and its p-n junction 195 to the collector layer of the active region 174. The p-n junction 195 is again naturally reverse biased by the transistor region operating potentials to provide an energy storage region which performs the function of the capacitor 164 of the circuit illustrated in FIG. 19.

In view of the foregoing description, it will be observed that the monolithic semiconductor device illustrated in FIGS. 20 and 21 is effective to provide the function of the circuit shown in FIG. 19 and is formed without the use of external leads except for the two bias or power supply connections and the signal output lead which is not shown but which may be taken from either of the collector layers of the two transistor regions 173 and 174. If a triggered multi-vibrator is desired instead of the free-running multi-vibrator illustrated in FIG. 19 a signal input connection may be made to the base circuit of either of the transistor regions. This may be accomplished by means of an ohmic contact connected to the leg 182 at a point adjacent the transistor region to which the input signal is to be supplied.

Figures 22, 23:
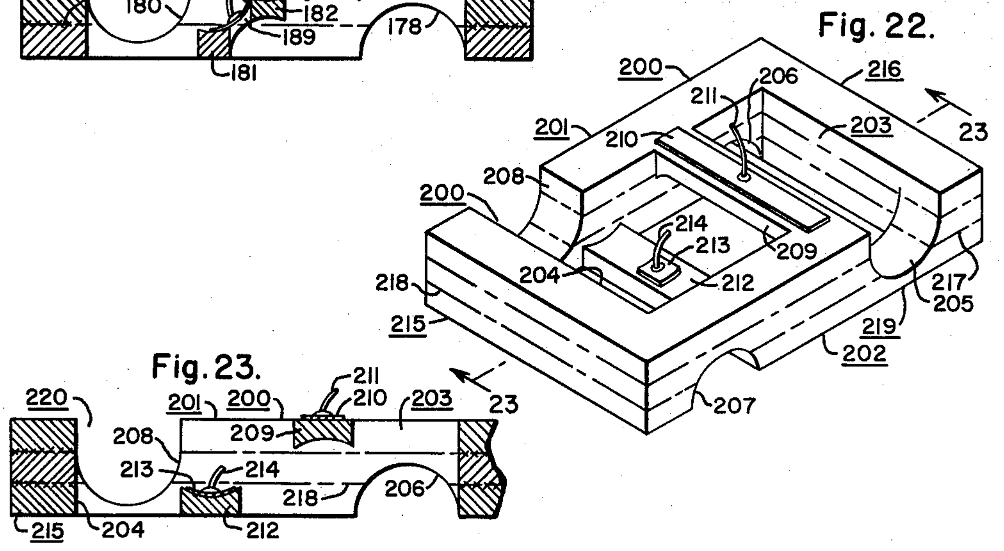
FIG. 22 is a perspective view illustrating a modified monolithic semiconductor device constructed in accordance with the present invention to perform the functions of the multi-vibrator circuit illustrated in FIG. 6.
FIG. 23 is a sectional view taken along a line substantially corresponding to the line 24—24 in FIG. 23.

FIGS. 22 and 23 illustrate another monolithic semiconductor device for performing the functions of the circuit illustrated in FIG. 6. The device shown in FIGS. 22 and 23 is generally similar to that shown in FIGS. 20 and 21 except that it does not include a center connecting leg between the two base layers of the two transistor regions like the leg 182 previously described. Thus, the semiconductor device illustrated in FIGS. 22 and 23 is indicated generally by the reference numeral 200 and includes a three layer active or transistor region 201 and a second such region 202 which are similar to and perform the functions of the transistor regions 173 and 174 previously described. In addition, the semiconductor device 200 includes holes or slots 203 and 204 corresponding to the holes 175 and 176 previously described and further includes a plurality of troughs 205, 206, 207 and 208 which are respectively identical to the troughs 177, 178, 179 and 180. The semiconductor device 200 also includes a connecting leg 209 extending between the emitter layers of the two transistor regions 201 and 202 together with an ohmic contact 210 which is secured to the top surface of this connecting layer and extends between and partially over the two transistor regions. The connecting leg 209 and its ohmic contact 210, of course, are similar to the connecting leg 183 and the ohmic contact 186 of the device shown in FIGS. 20 and 21. A ground connection is made to the ohmic contact 210 through a signal connector 211. Another leg 212 extends between the collector layers of the two transistor regions 210 and 202 to correspond with the leg 181 previously described. An ohmic contact 213 is secured to the leg 212 near its center and a connection is made from this contact to the negative terminal of the D.C. power supply via a conductor 214. The troughs and the holes also form a pair of end regions 215 and 216 which are similar to the regions 192 and 193 previously described and which perform the functions of the capacitors 76 and 74 of the multi-vibrator circuit shown in FIG. 6.

Each of these regions includes a p-n junction which is naturally reverse biased to form an energy storage region to simulate the capacitor action. The p-n junction in the region 216 is indicated by the reference numeral 217 while that in the region 215 connecting the base layer of the transistor region 202 with the collector layer of the transistor region 201 is indicated by the reference numeral 218. The troughs 205 and 208 may be treated or modified in the region of the p-n junctions 217 and 218 respectively to control the surface leakage thus providing shunt resistances corresponding to the resistors 69 and 79 of the circuit shown in FIG. 6. The troughs 205 and 208 may be made relatively deep to form thin connecting layers in the areas indicated by the reference numerals 219 and 220 to provide a connection between each p-n junction and its associated collector layer. These connecting layers 219 and 220, of course, perform the functions of the resistors 78 and 75, respectively, of the multi-vibrator circuit shown in FIG. 6. The portions of the connecting leg 212 lying on opposite sides of the ohmic contact 213, of course, perform the functions of the resistors 72 and 77 of the multi-vibrator circuit.

In view of the foregoing description, it will be recognized that the monolithic semiconductor device shown in FIGS. 2 and 3 acts like the free-running multi-vibrator shown in FIG. 6 with the only external connections being those for the power supply or bias and a signal output connection (not shown) which may be made through an ohmic contact secured to the collector layer of either of the active or transistor regions 201 and 202. Here again, if a triggered multi-vibrator is desired, a suitable signal input connection may be made through an ohmic contact (not shown) attached to the base layer of either of the active or transistor regions 201 or 202.

Figure 24:
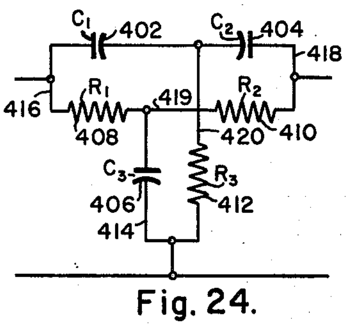
FIG. 24 is a schematic diagram of a conventional twin-T notch filter circuit.

Another example of the use of the slot-and-trough technique of this invention, in the designing of semiconductor functional electronic blocks, is illustrated by the twin-T filter. The basic conventional twin-T filter circuit is illustrated in FIG. 24. The basic conventional twin-T filter circuit consists of three capacitors 402, 404 and 406 and three resistors 408, 410 and 412. The three capacitors and resistors are connected in the manner illustrated by conductors 414, 416, 418, 419 and 420.

The circuit exhibits sharp attenuation at a specific frequency "F" when the following relationships are satisfied.

$$R_1=R_2=2R_3$$
$$C_1=C_2=\frac{1}{2}C_3$$
$$F=\frac{1}{2\pi R_1C_1}$$

With reference to FIG. 25, when the function of the conventional twin-T filter circuit of FIG. 24 is to be built into a functional electronic block, the capacitors 402, 404 and 406, also denoted $C_1$, $C_2$ and $C_3$ in FIG. 24, can be replaced by the capacitances associated with reverse biased p-n junction in three diodes 430, 432 and 434 built within a unitary block of a semiconductor material. The capacitance function of the reverse biased diode is denoted as $C'_1$ $C'_2$ and $C'_3$ for comparison purposes in FIG. 25. A variable D.-C. bias supply 436 controls the bias values of the three reverse biased p-n junctions within diodes 430, 432 and 434 which control the notch frequency of the filter. In order to control the frequency with the D.-C. bias supply 436, the bias supply must have a relatively high impedance so as not to load down the input to the filter, but the impedance of the capacitors $C'_1$, $C'_2$ and $C'_3$ formed by reverse biased junctions in diodes 430, 432 and 434, must be high relative to the impedance to the bias supply 436, so that virtually the entire bias voltage appears across the junction capacitors and not across the resistors. For this reason silicon, with its low junction reverse leakage, is preferred for fabricating the twin-T functional block.

The structure of the twin-T notch filter is such that the input and output terminals can be reversed, and so the primary fabrication problem is the matching of the resistors and capacitors to produce a sharp notch at the desired frequency. By using the slot-and-trough technique of this invention the various functional regions of the twin-T filter can be laid out in a monolithic block 440 as shown in FIG. 26.

With reference to FIG. 26, the block 440 has a single broad area p-n junction 442 situated approximately halfway between top surfaces 444 and bottom surface 446 thereof. The p-n junction 442 is between an n-type layer 441 and a p-type layer 443. The p-n junction 442 can be formed by diffusion, epitaxial growth, or any other process known to those skilled in the art. Two slots 448 and 450 are cut completely through the wafer by for example utrasonic cutting, air abrasive cutting or chemical etching. Three ohmic contact foils 452, 454 and 456 are alloyed to top surface 444 of the block. Two ohmic contacts 455 and 457 are alloyed to the bottom surface 446 of the block. The junction areas underneath the contacts 454, 456 and 452 are in the ratio of 1:1:2, and since capacitance is proportional to junction area for any given bias, the desired relationship set forth as $$C_1=C_2=\frac{1}{2}C_3$$

above is obtained if the junction area under contact 452 is considered as the functional capacitor $C'_3$ and the junction areas under contact 454 and contact 456 are considered functional capacitors $C'_1$ and $C'_2$ respectively.

A first trough 460 is then cut in the upper layer or n-type region 441. The trough 460 starts at the outside of the body 440 and terminates at both of the slots 448 and 450. The trough 460 cuts entirely through the n-type layer 441, through the p-n junction 442, and partially through p-type layer 443. This is illustrated more clearly in FIG. 27 which is a sectional view taken along line AA' of FIG. 26. Region or leg 461 between the slots 448 and 450 forms the functional equivalent of the resistance R of FIG. 24.

With reference to FIGS. 28 and 29 in addition to FIG. 26, two additional troughs 462 and 464 are cut in the body 440. FIG. 28 is a sectional view of the block of FIG. 26 taken along line BB' and FIG. 29 is a sectional view of the block of FIG. 26 taken along the line DD'. The two troughs, 462 and 464, are cut in the bottom surface 446 of the body 440 and extend entirely through the p-type layer 443, through the p-n junction 442, and partially through n-type layer 441. Two legs 466 and 468 formed by the troughs 462 and 464 respectively, form the functional equivalent of resistances $R_1$ and $R_2$ of FIG. 24. The leg 461 is so formed that the resistance thereof, $R_3$, is one-half of the resistance $R_1$ of leg 466 and one-half of the resistance $R_2$ of leg 468. When electrical leads are connected to contacts 454, 455 and 456 of the block, the block will function as a twin-T notch filter.

With reference to FIG. 30 there is illustrated a twin-T notch filter 500. In the structure of FIG. 30, the functional equivalent of resistance $R_3$ of FIG. 25, leg 502, is formed in the same layer as the functional equivalents of $R_1$ and $R_2$, of the FIG. 25, legs 504 and 506 respectively in FIG. 30. The filter 500 has two broad area p-n junctions 508 and 509. These p-n junctions however are not planar throughout the wafer as is p-n junction 442 of FIG. 26. The p-n junction 508 separates top p-type layer 520 and bottom n-type layer 521. The p-n junction 509 separates top p-type layer 520 and bottom n-type layer 523.

The structure of the twin-T notch filter of FIG. 30 is basically the same as the twin-T filter of FIG. 26. The structure of FIG. 30 has two slots 510 and 512 and three functional capacitors $C'_1$, $C'_2$ and $C'_3$ of FIG. 25 performed by the junction areas under ohmic contacts 514, 516 and 518 respectively. Two T-shaped ohmic contacts are affixed to the bottom surface of the body 500 similar to contacts 455 and 457 in FIGS. 27, 28 and 29. The capacitors have the desired 1:1:2 ratio. The structure of FIG. 30 differs from the structure of FIG. 26, however, in that the structure of FIG. 30 has only two troughs. Both troughs extend through the top layer 520 of the block and through the p-n junctions. Trough 522 is a linear trough which penetrates the p-n junction 508 between the slots 510 and 512 near the ohmic contact 518 of functional capacitor $C_3$. Trough 524 is a T-shaped trough penetrating the p-n junction 509 between ohmic contacts 514 and 516 of functional capacitors $C_1$ and $C_2$. When electrical leads are connected to contacts 514, 516 and the ohmic contact on the bottom surface opposite contact 518, the block will function as a twin-T notch filter.

In all of the forms of the invention thus far described, the use of troughs or grooves to form the discontinuities providing the region isolation creates a weakened area of the semiconductor wafer and, in some instances, particularly in cases where the troughs must be very deep, the wafer may become very fragile. Techniques for solving this fragility problem are illustrated in FIGS. 30 to 33 and in FIGS. 34 to 36 which illustrate two different methods for use in the formation of monolithic semiconductor devices where the planar areas of the wafer are formed by diffusion into the top and/or bottom surfaces.

The method illustrated in FIGS. 31 to 34 is used to eliminate mechanical weaknesses in cases which, in the devices previously described, would require relatively shallow troughs extending through an outer diffused layer into the parent crystal. To eliminate the necessity for using troughs to form the layer discontinuities in such cases a wafer 300 formed of silicon or other semiconductor material is employed having a raised section or rib 301 as shown in FIG. 31. A doping material is then diffused into the upper surface of the wafer 300 in the manner described above to form a wafer as shown in FIG. 32 including an upper diffused layer 302 having a depth slightly less than the thickness of the rib 301. Of course, the doping material may also be diffused into the lower surface of the wafer 300 to form three layer regions lying on opposite sides of the rib 301 but this is not illustrated in the drawings. In any event, after the diffusion has been completed, the rib 301 is removed in any suitable manner as by lapping to form the device illustrated in FIG. 33.

The removal of the rib 301 forms a flat, continuous outer surface 304 lying adjacent the outer diffused layer 302. The latter layer has a discontinuity 305 therein formed by a portion of the center layer 306 or parent crystal extending through the outer layer 302 to the outer face 304 of the wafer. This discontinuity 305 serves to isolate the two regions 307 and 308 lying on opposite sides thereof in exactly the same manner as the shallow troughs described above but it possesses the advantage that it does not weaken the wafer in the area of the isolation. To provide a discontinuity area of the same width as the groove being replaced, the original rib 301 must have a width which exceeds the desired area width by an amount equal to twice the depth of the layer 302. The discontinuity 305 may also be produced without requiring the use of a wafer with an outwarldy protruding rib thereon by masking the discontinuity area prior to the diffusion of the doping material. However, the masking may not be entirely effective with all diffusants and, hence, in the latter cases the use of ribs is preferred.

FIG. 34 shows a wafer employing discontinuity areas 305 formed in the manner illustrated in FIGS. 31 to 33. Each such discontinuity has one end terminating at a hole or slot formed in the wafer and extends across the flat face away from the slot.

To provide a region isolation commensurate with that described above where relatively deep grooves or troughs are required to pass through both a first diffused layer and the parent crystal and to extend into a second diffused layer on the opposite side of the crystal from the first layer, the method shown in FIGS. 35 to 37 may be used. In the practice of this method a block or wafer of semiconductor material of any of the types previously mentioned is first provided with one or more grooves or troughs 310 extending inwardly from either or both faces of the crystal. This groove is preferably formed by etching. A doping material is then diffused into both of the opposed faces of the crystal to form layers 311 and 312 as shown in FIG. 36 of predetermined depth. Each of the troughs 310 has a depth such that the thickness of the area 313 (FIG. 34) between the bottom of the trough and the opposite face of the crystal is slightly less than the combined depth of the two diffused layers 311 and 312 and, as a result, these layers meet in the area 313 after the diffusion has been completed. After the diffusion has been carried out, the wafer is lapped on the trough side or the upper side as viewed in FIGS. 35 to 37 to remove a layer having a thickness slightly greater than that of the layer 311 thus exposing the parent crystal in areas lying on opposite sides of the trough as is shown in FIG. 37. This produces a discontinuity 315 in the parent crystal layer to isolate the regions 316 and 317 just as effectively as would have been accomplished by a deep trough.

While the method just described limits the thickness of the wafer in the trough region to something slightly less than twice the junction depth or thickness of the diffused layer, it provides a significant improvement over the deep groove technique where this thickness was slightly less than one junction depth. The discontinuity formed by the method shown in FIGS. 35 to 37 may be used to replace the deep troughs in any of the monolithic semiconductor devices described above but in all cases the discontinuity terminates at one end at a slot or hole in the wafer and then extends away from the slot across the groove face of the wafer.

While particular embodiments of the invention have been illustrated and described, it will be apparent that many changes and modifications will readily occur to those skilled in this art, and it is therefore intended by the appended claims to cover any such changes and modifications as fall within the true spirit and scope of the invention.

What is claimed as new and desired to be secured by Letters Patent of the United States is:

1. A monolithic semiconductor device comprising a thin body of semiconductor material having first and second opposed flat faces and made up of a plurality of layers of different conductivity types cooperating to form at least one p-n junction, the layers being generally parallel to the flat faces, at least one slot extending entirely through the body between the flat faces and through the p-n junction, a first trough extending only partially through said body of semiconductor material inwardly from said first flat face, said first trough being deep enough to penetrate at least through the layer lying immediately adjacent said first flat face and having one end terminating at said slot, a second trough extending only partially through said body of semiconductor material and inwardly from said second flat face, said second trough being sufficiently deep to penetrate at least through the layer lying immediately adjacent said second face and also having one end terminating at said slot, said slot and said first and second troughs cooperating to isolate regions comprised of said layers of said semiconductor material performing different functions within said monolithic semiconductor device.

2. A monolithic semiconductor device comprising a thin body of semicondutor material having first and second opposed flat faces and made up of a plurality of layers of different conductivity types cooperating to form at least one p-n junction, the layers being generally parallel to the flat faces, at least one slot extending entirely through the body between the flat faces and through the p-n junction, a first trough extending only partially through said body of semiconductor material inwardly from said first flat face, said first trough being deep enough to penetrate at least through the layer lying immediately adjacent said first flat face and having one end terminating at said slot, the other end of the trough terminating at an edge of the body, a second trough extending only partially through said body of semiconductor material and inwardly from said second flat face, said second trough being sufficiently deep to penetrate at least through the layer lying immediately adjacent said second face and also having one end terminating at said slot, said slot and said first and second troughs cooperating to isolate regions comprised of said layers of said semiconductor material performing different functions within said monolithic semiconductor device.

3. A monolithic semiconductor device comprising a thin body of semiconductor material having first and second opposed flat faces and made up of a plurality of layers of different conductivity types cooperating to form at least one p-n junction, the layers being generally parallel to the flat faces, at least one slot extending entirely through the body between the flat faces and through the p-n junction, a first trough extending only partially through said body of semiconductor material inwardly from said first flat face, said first trough being deep enough to penetrate at least through the layer lying immediately adjacent said first flat face and having one end terminating at said slot, the other end of the trough terminating at an edge of the body, a second trough extending only partially through said body of semiconductor material and inwardly from said second flat face, said second trough being sufficiently deep to penetrate as least through the layer lying immediately adjacent said second face and also having one end terminating at said slot, and the other end terminating at an edge of the body, said slot and said first and second troughs cooperating to isolate regions comprised of said layers of said semi-conductor material performing different functions within said monolithic semiconductor device.

4. A monolithic semiconductor device comprising a thin body of semiconductor material having first and second opposed flat faces and made up of a plurality of layers of different conductivity types cooperating to form at least one p-n junction, the layers being generally parallel to the flat faces, at least two slots extending entirely through the body between the flat faces and through the p-n junction, a first trough extending only partially through said body of semiconductor material inwardly from said first flat face, said first trough being deep enough to penetrate at least through the layer lying immediately adjacent said first flat face and having one end terminating at one of said slots, the other end of the trough terminating at the other slot, a second trough extending only partially through said body of semiconductor material and inwardly from said second flat face, said second trough being sufficiently deep to penetrate at least through the layer lying immediately adjacent said second face and also having one end terminating at said one slot, said one slot and said first and second troughs cooperating to isolate regions comprised of said layers of said semiconductor material performing different functions within said monolithic semiconductor device.

5. A monolithic semiconductor device comprising a thin body of semiconductor material having first and second opposed flat faces and made up of a plurality of layers of different conductivity types cooperating to form at least one p-n junction, the layers being generally parallel to the flat faces, at least two slots extending entirely through the body between the flat faces and through the p-n junction, a first trough extending only partially through said body of semiconductor material inwardly from said first flat face, said first trough being deep enough to penetrate at least through the layer lying immediately adjacent said first flat face and having one end terminating at one of said slots, the other end of the trough terminating at the other slot, a second trough extending only partially through said body of semiconductor material and inwardly from said second flat face, said second trough being sufficiently deep to penetrate at least through the layer lying immediately adjacent said second face and also having one end terminating at one of said slots, the other end of said trough terminating at an edge of said body, said slots and said first and second troughs cooperating to isolate regions comprised of said layers of said semiconductor material performing different functions within said monolithic semiconductor device.

6. A monolithic semiconductor device comprising a thin body of semiconductor material having first and second opposed flat faces and made up of a plurality of layers of different conductivity types cooperating to form at least one p-n junction, the layers being generally parallel to the flat faces, at least two slots extending entirely through the body between the flat faces and through the p-n junction, a first trough extending only partially through said body of semiconductor material inwardly from said first flat face, said first trough being deep enough to penetrate at least through the layer lying immediately adjacent said first flat face and having one end terminating at one of said slots, the other end of the trough terminating at the other slot, a second trough extending only partially through said body of semiconductor material and inwardly from said second flat face, said second trough being sufficiently deep to penetrate at least through the layer lying immediately adjacent said second face and also having an end terminating at each of said slots, said slots and said first and second troughs cooperating to isolate regions comprised of said layers of said semiconductor material performing different functions within said monolithic semiconductor device.

7. A monolithic semiconductor device comprising a thin body of semiconductor material having first and second opposed flat faces and made up of a plurality of layers of different conductivity types cooperating to form at least one p-n junction, the layers being generally parallel to the flat faces, at least one slot extending entirely through the body between the flat faces and through the p-n junction, a first trough extending only partially through said body of semiconductor material inwardly from said first flat face, said first trough being deep enough to penetrate at least through the layer lying immediately adjacent said first flat face and having one end terminating at said slot, a second trough extending only partially through said body of semiconductor material and inwardly from said second flat face, said second trough being sufficiently deep to penetrate at least through the layer lying immediately adjacent said second face and also having one end terminating at said slot, a third trough extending from said first trough to said second trough, the other ends of said first and second troughs terminating at the third trough, said slot and said troughs cooperating to isolate regions comprised of said layers of said semiconductor material performing different functions within said monolithic semiconductor device.

8. A monolithic semiconductor device comprising a thin body of semiconductor material having first and second opposed faces and made up of a plurality of layers of different conductivity types cooperating to form at least one p-n junction, at least one slot extending between the faces and through the p-n junction, a first discontinuity in the layer lying immediately adjacent said first face having one end terminating at said slot, a second discontinuity in the layer lying immediately adjacent said second face also having one end terminating at said slot, said slot and said first and second discontinuities cooperating to isolate regions of said semiconductor material performing different functions within said monolithic semiconductor device.

9. A monolithic semiconductor device comprising a thin body of semiconductor material having first and second opposed faces and made up of a plurality of layers of different conductivity types cooperating to form at least one p-n junction, at least one slot extending between the flat faces and through the p-n junction, a first discontinuity in a first layer lying immediately adjacent said first face having one end terminating at said slot, said first discontinuity being formed by a portion of a second layer lying immediately adjacent said first layer with said portion extending through said first layer to said first face, a second discontinuity in a second layer lying immediately adjacent said second face also having one end terminating at said slot, said slot and said first and second discontinuities cooperating to isolate regions comprised of said layers of said semiconductor material performing different functions within said monolithic semiconductor device.

10. A monolithic semiconductor device formed from a body of semiconductor material having faces separated by a plurality of layers of semiconductor material of different conductivity types, said semiconductor material comprising a plurality of regions comprised of said layers forming at least one p-n junction between said layers, and means for effectively isolating said regions, said means comprising at least one slot extending completely through the layers between said faces and at least two discontinuities in the layers lying immediately adjacent said faces, said discontinuities having at least one end terminating at a slot and extending along a portion of the face away from said slot, at least two of the discontinuities being in different layers.

11. A monolithic semiconductor device formed from a body of semiconductor material having first and second faces separated by a plurality of layers of semiconductor material of different conductivity types, said semiconductor material comprising first and second regions each including a p-n junction formed between said layers, and means for effectively isolating said regions, said means comprising a slot extending between said faces and through said layers, a first discontinuity extending through a first of said layers lying immediately adjacent said first face and having one end terminating at said slot, said first discontinuity extending away from said slot across a portion of said first face, and a second discontinuity in a second layer lying immediately adjacent said second face, said second discontinuity having one end terminating at said slot and extending away from said slot across a portion of the second face.

12. A monolithic semiconductor device formed from a body of semiconductor material having first and second faces separated by a plurality of layers of semiconductor material of different conductivity types, said semiconductor material comprising first and second regions each including at least one p-n junction formed between said layers, and means for effectively isolating said regions, said means comprising a slot extending between said faces and through said layers, a first trough extending only partially through said material from said first face and a second trough extending through said material from said second face, each of said troughs being of sufficient depth to penetrate through the layer lying immediately adjacent the face in which the trough is formed and each trough having one end terminating at said slot and extending away from said slot along a portion of the face in which the trough is formed.

13. A monolithic semiconductor device comprising a unitary body of semiconductor material having a pair of opposed faces separated by at least two layers of alternating conductivity types, a pair of active regions each made up of some of said layers, means defining a plurality of holes extending through said layers from one face to the other and located between said active regions to form in said semiconductor material a plurality of legs interconnecting the different layers of said active regions, at least one of said legs being made up of a plurality of said layers at least one of which has a discontinuity therethrough terminating at one end at one of said holes, said one leg including a p-n junction reverse biased to form an energy storage region.

14. A monolithic semiconductor device comprising a unitary body of semiconductor material having a pair of opposed faces separated by at least three superimposed layers of alternating conductivity types, a pair of spaced apart active regions each including some of said layers, and means defining a plurality of holes extending through said layers from one face to the other and located between said active regions to form in said semiconductor material a plurality of legs interconnecting the different layers of said active regions.

15. A monolithic semiconductor device comprising a thin body of semiconductor material having first and second opposed flat faces and made up of a plurality of layers of different conductivity types cooperating to form at least one p-n junction, the layers being generally parallel to the flat faces, at least one slot extending entirely through the body between the flat faces and through the p-n junction, a first trough extending only partially through said body of semiconductor material inwardly from said first flat face, said first trough being deep enough to penetrate at least through the layer lying immediately adjacent said first flat face and having one end terminating at said slot, a second trough extending only partially through said body of semiconductor material and inwardly from said second flat face, said second trough being sufficiently deep to penetrate at least through the layer lying immediately adjacent said second face and also having one end terminating at said slot, said slot and said first and second troughs cooperating to isolate regions comprised of said layers of said semiconductor material performing different functions within said monolithic semiconductor device, one of which functions is that of a parallel resistance-capacitance network performed by a reverse biased p-n junction alone.

References Cited by the Examiner

UNITED STATES PATENTS

| | | | |
|---|---|---|---|
| 2,663,830 | 12/53 | Oliver | 317—235 |
| 2,780,569 | 2/57 | Hewlett | 148—1.5 |
| 2,858,489 | 10/58 | Henkels | 317—235 |
| 2,875,505 | 3/59 | Pfann | 317—235 |
| 2,954,307 | 9/60 | Shockley | 148—1.5 |
| 3,015,763 | 1/62 | Bailey | 317—235 |
| 3,016,313 | 1/62 | Pell | 148—1.5 |
| 3,100,276 | 8/63 | Meyer | 317—235 |

DAVID J. GALVIN, *Primary Examiner.*

SAMUEL BERNSTEIN, BENNETT G. MILLER, *Examiners.*